United States Patent
Hai

(10) Patent No.: US 11,694,639 B2
(45) Date of Patent: Jul. 4, 2023

(54) BACKLIGHT MODULE AND METHOD FOR CALCULATING VIEWING ANGLE FOR UNKNOWN BACKLIGHT MODULE

(71) Applicant: Shenzhen China Star Optoelectronics Semiconductor Display Technology Co., Ltd., Guangdong (CN)

(72) Inventor: Bo Hai, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 452 days.

(21) Appl. No.: 17/047,079

(22) PCT Filed: Sep. 4, 2020

(86) PCT No.: PCT/CN2020/113520
§ 371 (c)(1),
(2) Date: Oct. 13, 2020

(87) PCT Pub. No.: WO2022/027762
PCT Pub. Date: Feb. 10, 2022

(65) Prior Publication Data
US 2023/0104926 A1    Apr. 6, 2023

(30) Foreign Application Priority Data
Aug. 7, 2020    (CN) .......................... 202010789518.3

(51) Int. Cl.
*G09G 3/34*    (2006.01)
*G09G 3/36*    (2006.01)

(52) U.S. Cl.
CPC ............. *G09G 3/3406* (2013.01); *G09G 3/36* (2013.01); *G09G 2320/028* (2013.01); *G09G 2320/068* (2013.01); *G09G 2320/0626* (2013.01)

(58) Field of Classification Search
CPC .................. G09G 3/3406; G09G 3/36; G09G 2300/0447; G09G 2320/028; G09G 2320/0626; G09G 2320/068; G09G 2360/16
See application file for complete search history.

(56) References Cited

U.S. PATENT DOCUMENTS 9,734,750 B2 * 8/2017 Chen .................... G09G 3/2074
10,902,801 B2 * 1/2021 Shan .................... G09G 3/3607
11,188,169 B2 * 11/2021 Chung .............. G02F 1/136222
(Continued)

FOREIGN PATENT DOCUMENTS

| CN | 101587695 | 11/2009 |
|---|---|---|
| CN | 103106884 | 5/2013 |

(Continued)

*Primary Examiner* — Vijay Shankar

(57) ABSTRACT

The present invention provides a backlight module and a method for calculating viewing angle for an unknown backlight module. In the present invention, brightness-viewing angle values of the unknown backlight module can be calculated according to the color saturation-viewing angle data of the unknown backlight module at specific viewing angles, and thus are taken to deploy the brightness-viewing angle values of a produced backlight module to be as the same as the brightness-viewing angle values of the unknown backlight module.

10 Claims, 8 Drawing Sheets

(56) References Cited

U.S. PATENT DOCUMENTS

| | | | | |
|---|---|---|---|---|
| 11,430,399 B2 * | 8/2022 | Shan | ................... | G09G 3/3614 |
| 11,538,429 B2 * | 12/2022 | Hai | ................... | G09G 3/3614 |
| 2014/0218411 A1 * | 8/2014 | Chen | ................... | G09G 3/3611 |
| | | | | 345/88 |
| 2016/0377920 A1 | 12/2016 | Park et al. | | |

FOREIGN PATENT DOCUMENTS

| | | |
|---|---|---|
| CN | 111103708 | 5/2020 |
| CN | 111292697 | 6/2020 |
| CN | 111583876 | 8/2020 |

\* cited by examiner

BACKLIGHT MODULE AND METHOD FOR CALCULATING VIEWING ANGLE FOR UNKNOWN BACKLIGHT MODULE

RELATED APPLICATIONS

This application is a National Phase of PCT Patent Application No. PCT/CN2020/113520 having International filing date of Sep. 4, 2020, which claims the benefit of priority of Chinese Patent Application No. 202010789518.3 filed on Aug. 7, 2020. The contents of the above applications are all incorporated by reference as if fully set forth herein in their entirety.

FIELD AND BACKGROUND OF THE INVENTION

The present invention relates to display technologies, and more particularly to a backlight module and a method for calculating viewing angle for an unknown backlight module.

Viewing angle is an important parameter of liquid crystal display panels. The wider the viewing angle is, the slower the brightness viewed from a side decreases. Because human eyes are sensitive to brightness, the higher the brightness seen from the side is, the better a viewing effect from a side view may yield. Nowadays, with the development of technology, customers' demands on the viewing angle are gradually increasing.

Liquid crystal display (LCD) devices, such as LCD TVs, have been widely used. At present, liquid crystal display devices can be divided into three categories, namely twisted nematic/super twisted nematic (TN/STN), in-plane switching (IPS) and vertical alignment (VA) types. Common display types of corresponding LCD TVs include TN, IPS and VA, each of which has its advantages and disadvantages. The VA display type has contrast much higher than that of the IPS display type and lower response time, and there is no need to perform rubbing alignment, and thus has become a common display type of thin-film transistor liquid crystal displays (TFT-LCDs) used for large-scaled LCD TVs. However, viewing angle property of the VA display type is worse than that of the IPS display type. When viewed from a side, display quality of the VA display type is worse than that of the IPS display type and this needs to be improved. The VA type of liquid crystal panels have been developed with various technologies to improve color shift or deviation, such as 4-domain and 8-domain structures designed through liquid crystal cell processes.

When the liquid crystal panels are introduced to customers' verification, the customers often have requirements for the viewing angle. The VA type of liquid crystal panels have a problem of color wash out, which needs to be improved for the customers having a strict demand on the viewing angle.

What a company produces are half-finished products and a factory uses its own backlight module to measure the viewing angle data. However, the customers use its own backlight module to measure the data. The backlight modules having different viewing angles will affect viewing angle property of the module, thereby affecting our evaluation on the display panels. As a result, there is a situation that the viewing angle is qualified when monitoring the data in a factory of the company, but is unqualified when measured by the customers. Therefore, there is a need to improve such a problem. However, it is often difficult for the customers to provide the viewing angle data of the backlight module. It is an unknown backlight module. The customers can only provide color saturation-viewing angle data measured at specific viewing angles for the unknown backlight module. This makes us unable to monitor the viewing angle data accurately. Therefore, there is a need to solve the problem regarding how to deploy viewing angle parameter for a produced backlight module based on the color saturation-viewing angle data measured at specific viewing angles for an unknown backlight module to satisfy the customers' needs on the viewing angle.

SUMMARY OF THE INVENTION

Regarding above drawbacks and deficiencies in the existing arts, the present invention provides a backlight module and a method for calculating viewing angle of an unknown backlight module. With converse thinking, brightness-viewing angle values of the unknown backlight module can be calculated at specific viewing angles of the unknown backlight module. This solves the problem of inability to accurately deploy the brightness-viewing angle parameter of a produced backlight module caused when viewing angle data of the backlight module are unavailable, and inability to satisfy customers' needs.

An objective of the present invention is to provide a method for calculating viewing angle of an unknown backlight module, including steps of:

obtaining color saturation-viewing angle data $Dc(i)$ measured at specific viewing angles for the unknown backlight module;

measuring the color saturation-viewing angle data $Dc'(i)$ and brightness-viewing angle values $A(i)$ for a known backlight module at the specific viewing angles;

calculating a ratio x of the color saturation-viewing angle data $Dc'(i)$ of the known backlight module to the color saturation-viewing angle data $Dc(i)$ of the unknown backlight module for each of the specific viewing angles, where $x=Dc'(i)/Dc(i)$;

calculating a ratio y of the viewing angle of the known backlight module to the viewing angle of the unknown backlight module based on the ratio x, for each of the specific viewing angles; and obtaining the brightness-viewing angle values Z of the unknown backlight module at corresponding angles for the specific viewing angles by multiplying the brightness-viewing angle values $A(i)$ of the known backlight module by the ratio y, where $Z=A(i)*y$.

Further, a positive correlation exists between the ratio y and the ratio x.

Further, a relation between the ratio y and the ratio x satisfies $y=3.0703x-2.0416$.

Further, the values 3.0703 and 2.0416 are varied within a range of ±(0.1%-2%).

Further, the value 2.0416 is varied within a range of ±(0.1%-2%).

Further, the specific viewing angles are horizontal or vertical viewing angles and are within ±(0-90) degrees.

Further, the angles among the specific viewing angles include 0, ±15, ±30, ±45, ±60 and ±90 degrees.

Further, the maximum gray level for the backlight module is, but is not limited to, 128.

Further, the maximum gray level for the backlight module is, but is not limited to, 255.

The present invention further provides a backlight module, wherein any of above methods for calculating viewing angle of an unknown backlight module is used to deploy the viewing angle of the backlight module.

The beneficial effects of the present invention are described as follows. A method for calculating viewing angle of an unknown backlight module and a backlight module are provided. Brightness-viewing angle values of the unknown backlight module can be calculated according to the color saturation-viewing angle data of the unknown backlight module at specific viewing angles, and thus are taken to deploy the brightness-viewing angle values of a produced backlight module to be as the same as the brightness-viewing angle values of the unknown backlight module. This avoids the problem of inability to accurately deploy the brightness-viewing angle parameter of a produced backlight module caused when viewing angle data of the backlight module are unavailable, thereby improving customer satisfaction.

DESCRIPTION OF SPECIFIC EMBODIMENTS OF THE INVENTION

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

The steps of all methods described herein can be performed in any suitable order unless otherwise clearly contradicted by context. The variations of the present invention are not limited to the described order. The use of any and all implementations or exemplary language (e.g., "such as" or "for example") provided herein, is intended merely to better illuminate the present invention and does not pose a limitation on the scope of the present invention unless otherwise claimed. Numerous modifications and adaptations will be readily apparent to persons skilled in the art without departing from the spirit and scope of the present invention.

Also, it should also be noted that in some alternative implementations, the steps of all methods described herein may occur out of the order. For example, two steps illustrated in succession may in fact be executed substantially concurrently or the two steps may sometimes be executed in the reverse order.

Embodiments of the present invention will be described in detail herein with reference to the drawings. The present invention may be embodied in many different forms and the present invention is not intended to be construed as being limited to the specific embodiments set forth herein. The embodiments of the present invention are provided to explain the practical applications of the present invention so that those skilled in the art can understand various embodiments of the present invention and various modifications suitable for particular intended applications.

Figure 1:
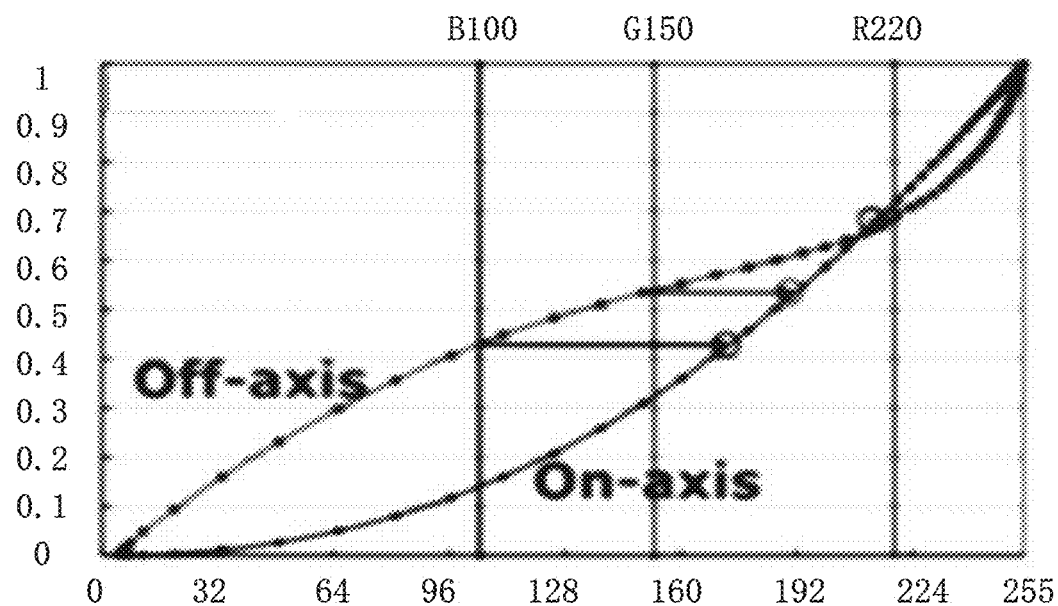
FIG. 1 is a schematic diagram illustrating a fundamental reason regarding why color deviation occurs on a liquid crystal panel when viewed from a side.

At present, customers often have requirements for viewing angle when liquid crystal panels produced by a company are introduced to the customers' verification. The VA type of liquid crystal panels have a problem of color wash out, which leads to color shift or deviation when viewed from a side. The fundamental cause of the color deviation occurred when viewed from a side is illustrated by FIG. 1. The horizontal axis of FIG. 1 indicates gray level and the vertical axis of FIG. 1 indicates normalized luminance. In FIG. 1, B represents blue, G represents green and R represents red. Gama (GM) curves obtained when viewed from a side and viewed straight on are inconsistent with each other. The greater the difference between of gama curves obtained when viewed from the side (Off-axis) and viewed straight on (On-axis), the worse the display quality obtained when viewed from the side. Take an image of skin with a specific color as an example. B represents blue, G represents green and R represents red. When viewed straight on, the skin color is composed of R 220, G 150 and B 100. When viewed from a side, the skin color has a great change in RGB ratio and is composed of R 215, G 192 and B 176. This is because the gama curves are different when viewed from the side and when viewed straight on. It can be seen that the color with a lower gray level increases much more. This causes yellow skin to become white and results in poor quality when viewed from the side.

Some customer proposed a method to evaluate a change of color saturation when viewed from a side and viewed straight on, as follows:

Dc=C(viewed from a side)/C(viewed from the front), where C represents color saturation (Chroma), C(viewed from a side) represents the color saturation viewed from a side and C(viewed from the front) represents the color saturation viewed from the front. Dc=(color saturation viewed from a side)/(color saturation viewed from the front).

Figure 2:
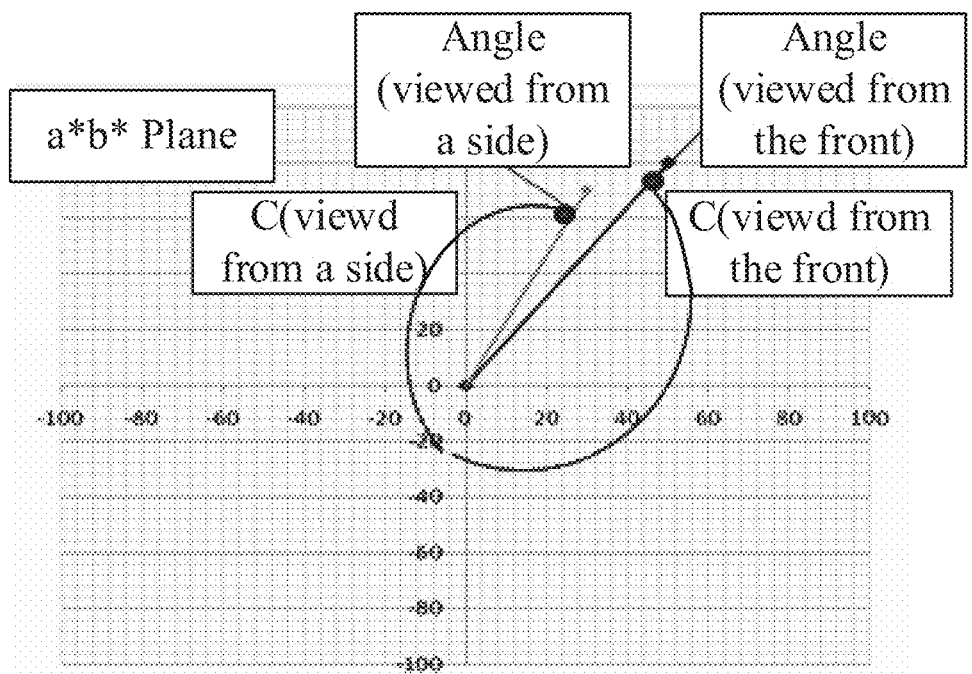
FIG. 2 is a schematic diagram illustrating measurements on color saturation in laboratory system.

As shown in FIG. 2, it is expressed as chroma or saturation C=(a2+b2)0.5 in CIE 1976 Lab definition in laboratory (Lab) system.

The maximum gray level for the backlight module is, but is not limited to, 128.

Alternatively, the maximum gray level for the backlight module is, but is not limited to, 255.

Taking 255 as the maximum gray level for the backlight module for example, a customer uses different combinations of skin color to evaluate Dc, as follows:

|  | R | G | B |
|---|---|---|---|
| Skin2 | 133 | 101 | 75 |
| Skin4 | 192 | 156 | 129 |
| Skin5 | 186 | 161 | 143 |
| Skin6 | 211 | 153 | 126 |

The gray levels of Skin2 and Skin4, 5, 6 are quite different. Therefore, we can use Skin5 to represent Skin4, 5, 6 and uses Skin 5 and Skin2 together to clarify the relationship between viewing angle of the backlight module and the color saturation-viewing angle according to the formula of Dc.

Two sets of measured data for narrow and wide viewing angles (light patterns) of the backlight module are considered in the following.

Figure 3A:
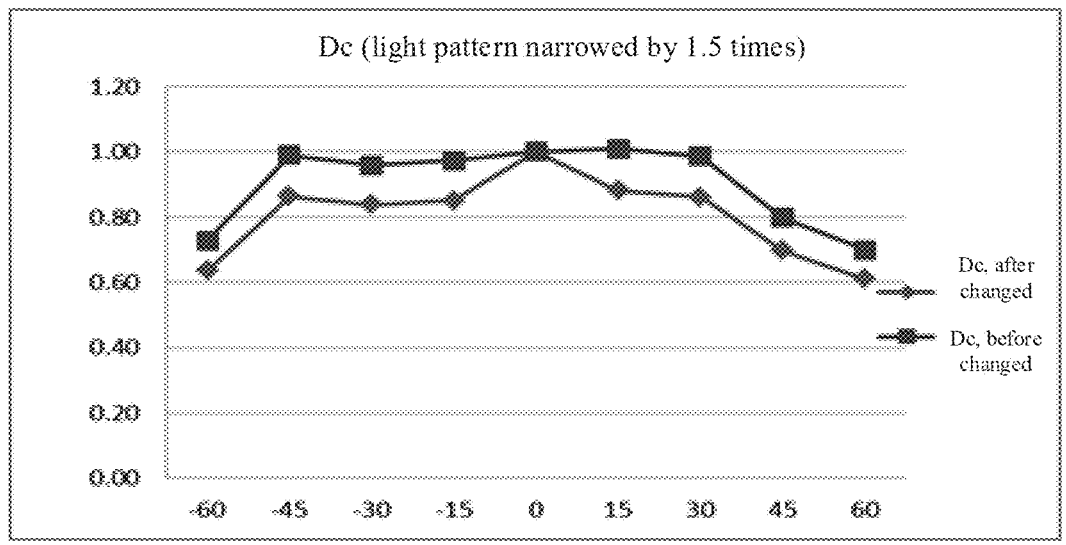
FIG. 3A is a diagram showing comparative curves for Skin5 before and after the viewing angle of the backlight module gets narrow.
Figure 3B:
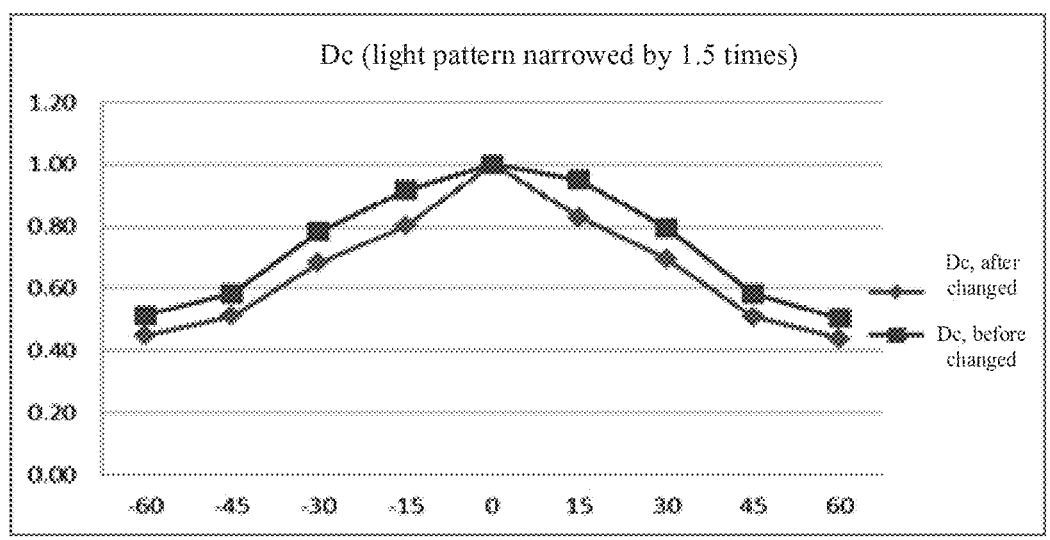
FIG. 3B is a diagram showing comparative curves for Skin2 before and after the viewing angle of the backlight module gets narrow.

As shown in FIG. 3A and FIG. 3B, color saturation-viewing angles Dc are calculated for different skin colors in a case that the viewing angle (light pattern) of the backlight module becomes narrow. FIG. 3A is a diagram showing comparative curves for Skin5 before and after the viewing angle (light pattern) of the backlight module gets narrow. FIG. 3B is a diagram showing comparative curves for Skin2 before and after the viewing angle (light pattern) of the backlight module gets narrow. The horizontal axis of FIGS. 3A and 3B indicates gray level and the vertical axis of FIGS. 3A and 3B indicates normalized luminance. It can be seen from these figures that Dc of both Skin2 and Skin5 deteriorates after the viewing angle (light pattern) of the backlight module is narrowed by 1.5 times. It is inferred that Dc of Skin2, 4, 5, 6 will all deteriorate after the viewing angle (light pattern) of the backlight module is narrowed.

Figure 4A:
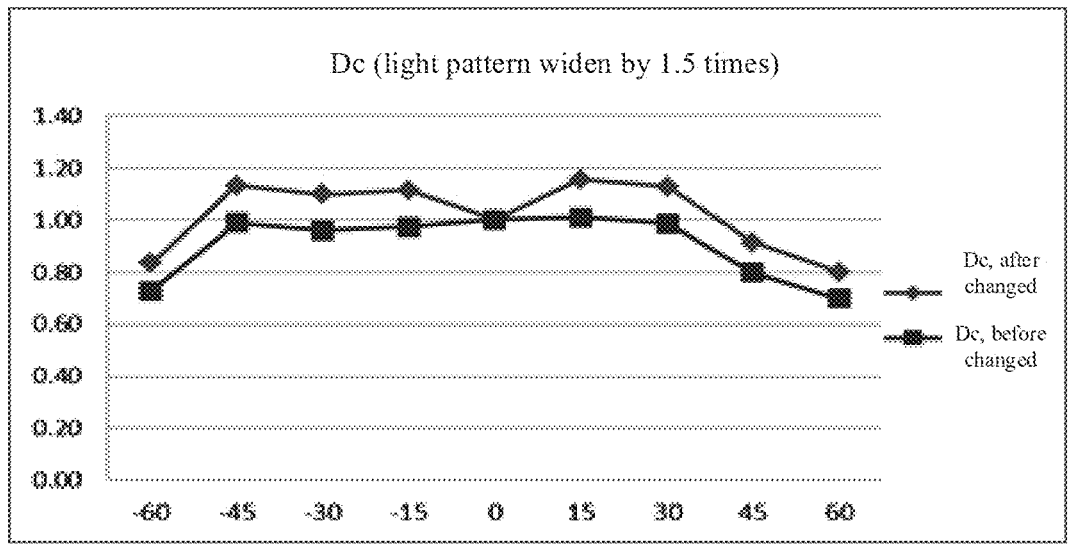
FIG. 4A is a diagram showing comparative curves for Skin5 before and after the viewing angle of the backlight module gets wide.
Figure 4B:
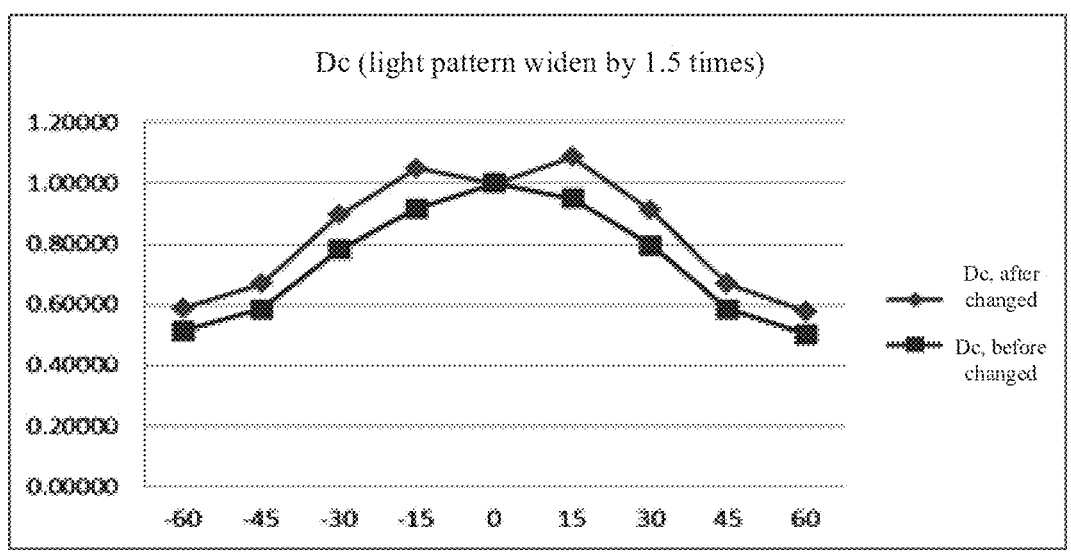
FIG. 4B is a diagram showing comparative curves for Skin2 before and after the viewing angle of the backlight module gets wide.

As shown in FIG. 4A and FIG. 4B, color saturation-viewing angles Dc are calculated for different skin colors in a case that the viewing angle (light pattern) of the backlight module becomes wide. FIG. 4A is a diagram showing comparative curves for Skin5 before and after the viewing angle (light pattern) of the backlight module gets wide. FIG. 4B is a diagram showing comparative curves for Skin2 before and after the viewing angle (light pattern) of the backlight module gets wide. The horizontal axis of FIGS. 4A and 4B indicates gray level and the vertical axis of FIGS. 4A and 4B indicates normalized luminance. It can be seen from these figures that Dc of both Skin2 and Skin5 is improved after the viewing angle (light pattern) of the backlight module is widen by 1.5 times. It is inferred that Dc of Skin2, 4, 5, 6 will all be improved after the viewing angle (light pattern) of the backlight module is widen.

By above calculation, the relationship between the color saturation-viewing angle Dc and the viewing angle of the backlight module is found by us, as follows:

If the light pattern gets narrow, Dc of Skin2, 4, 5, 6 all deteriorates;

If the light pattern gets wide, Dc of Skin2, 4, 5, 6 is all improved.

Accordingly, for backlight, a factor that affects the color saturation-viewing angle Dc is found by us, that is, the viewing angle of the backlight module. There is a strong or positive correlation between the color saturation-viewing angle Dc and the viewing angle of the backlight module.

In the following, we subdivide variation range of the viewing angle of the backlight module and take these measured data to clarify the relationship between the viewing angle of the backlight module and the color saturation-viewing angle Dc.

Figure 5A:
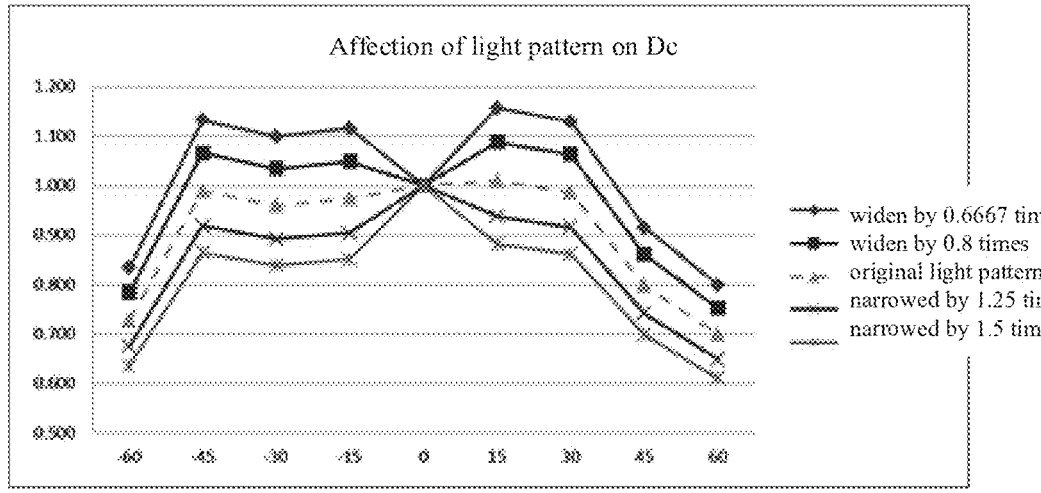
FIG. 5A is a diagram showing comparative curves for Skin5 as the viewing angles of the backlight module are varied.
Figure 5B:
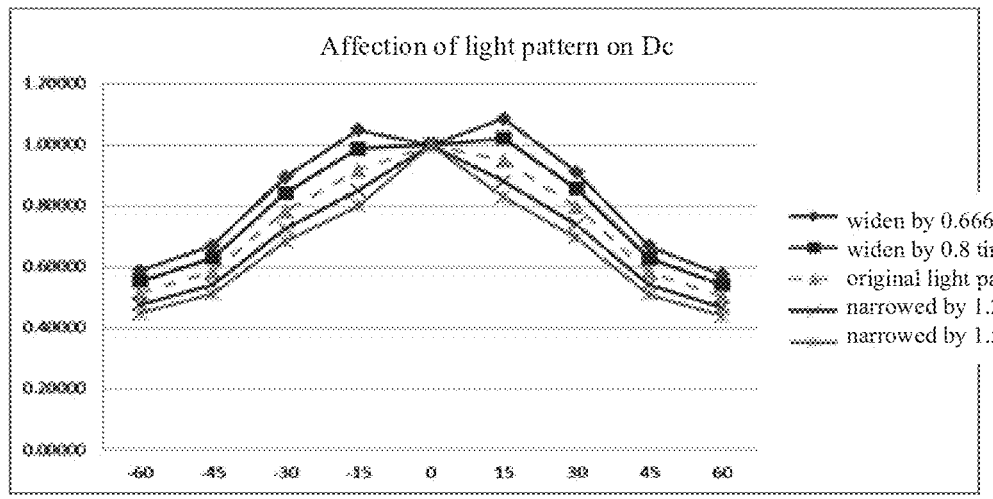
FIG. 5B is a diagram showing comparative curves for Skin2 as the viewing angles of the backlight module are varied.

Specifically, as shown in FIGS. 5A and 5B, influences on the color saturation-viewing angle Dc by original light pattern (i.e., original viewing angle of the backlight module), the viewing angle of the backlight module narrowed by 1.5 times, the viewing angle of the backlight module narrowed by 1.25 times, the viewing angle of the backlight module widen by 0.8 times and the viewing angle of the backlight module widen by 0.667 times are evaluated for Skin2, 5, respectively, using the measured data.

FIG. 5A is a diagram showing comparative curves for Skin5 as the viewing angles of the backlight module are varied. FIG. 5B is a diagram showing comparative curves for Skin2 as the viewing angles of the backlight module are varied. The horizontal axis of FIGS. 5A and 5B indicates gray level and the vertical axis of FIGS. 5A and 5B indicates normalized luminance.

Figure 6A:
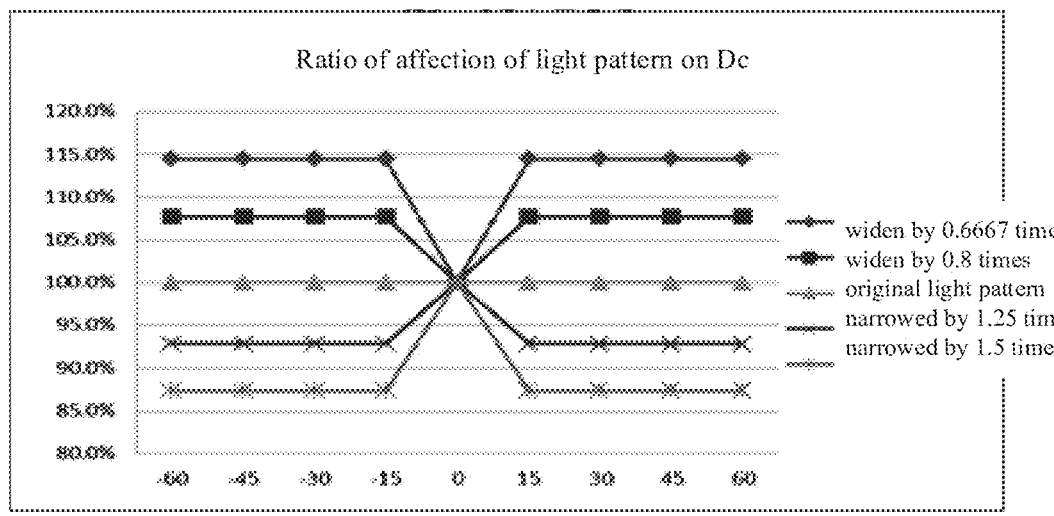
FIG. 6A is a diagram showing curves of ratios of viewing angles of a backlight module to color saturation-viewing angles for Skin5.
Figure 6B:
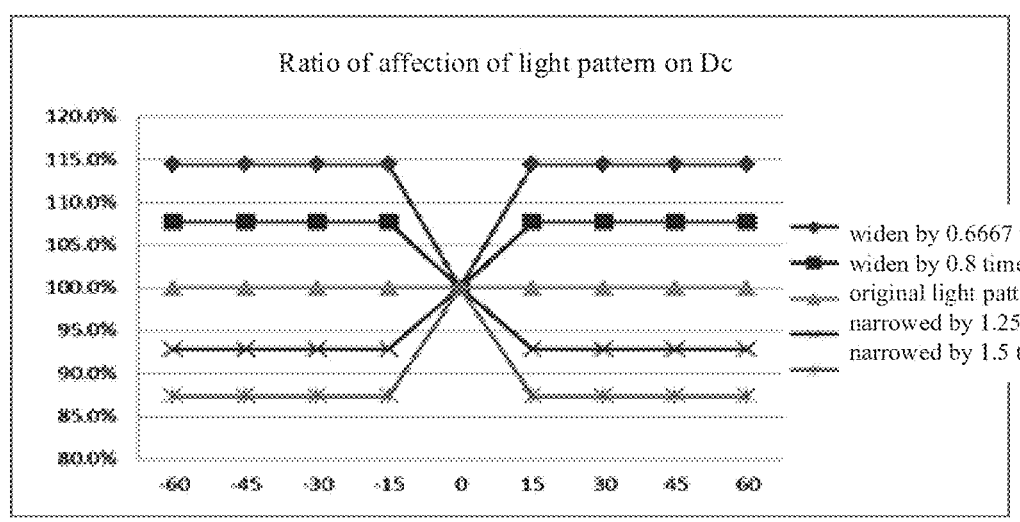
FIG. 6B is a diagram showing curves of ratios of viewing angles of a backlight module to color saturation-viewing angles for Skin2.

As shown in FIGS. 6A and 6B, ratios of different viewing angles of the backlight module to the color saturation-viewing angle Dc are calculated according to the data shown in FIGS. 5A and 5B. FIG. 6A is a diagram showing curves of the ratios of the viewing angles of the backlight module to the color saturation-viewing angle Dc for Skin5. FIG. 6B is a diagram showing curves of the ratios of the viewing angles of the backlight module to the color saturation-viewing angle Dc for Skin2. The horizontal axis of FIGS. 6A and 6B indicates gray level and the vertical axis of FIGS. 6A and 6B indicates the ratios for thee color saturation-viewing angle Dc.

Figure 7:
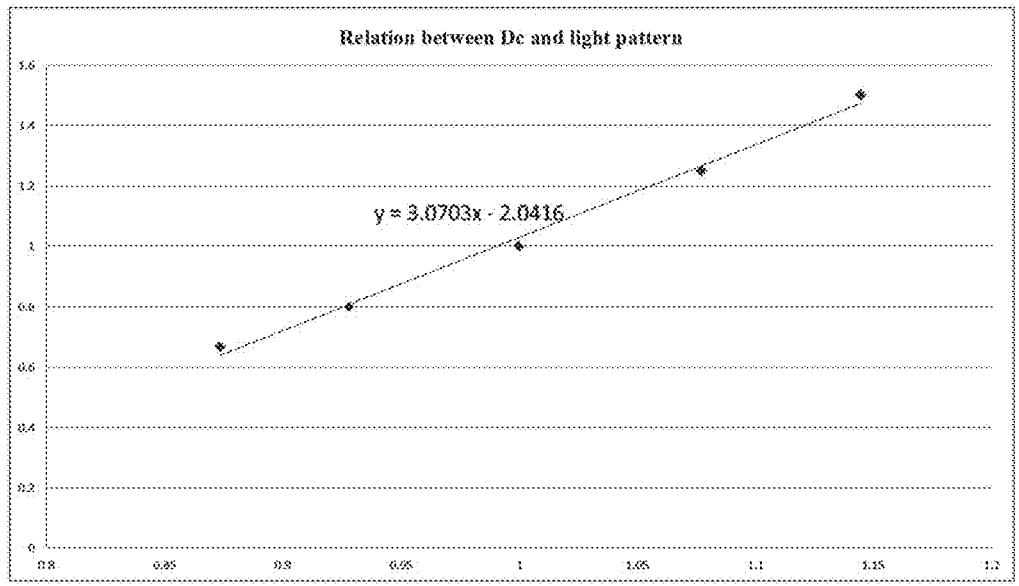
FIG. 7 is a schematic diagram illustrating a relation between viewing angle of a backlight module and color saturation-viewing angle obtained by fitting using a formula.

It can be seen from FIGS. 6A and 6B that as the viewing angles (light pattern) of the backlight module are varied, the color saturation-viewing angles Dc of Skin2, 4, 5, 6 are varied with a same ratio, and particularly are varied with a same ratio for each viewing angle. Therefore, we can conduct fitting and normalization to find an equation representing the relationship between the viewing angle of the backlight module and the color saturation-viewing angle Dc, as shown in FIG. 7. The horizontal axis (i.e., x) of FIG. 7 indicates a ratio for the color saturation-viewing angle Dc and the vertical axis (i.e., y) of FIG. 7 indicates a ratio for the viewing angle of the backlight module. It can be seen from FIG. 7 that there is a strong correlation between the changes of the viewing angle of the backlight module and the changes of the color saturation-viewing angle Dc, and their relationship can be represented by a straight line, that is, a positive correlation can be got by the fitting. Accordingly, y=3.0703x−2.0416 is obtained, where x is a ratio indicating the changes of the color saturation-viewing angle Dc and y is a ratio indicating the changes of the viewing angle of the backlight module.

Therefore, we can obtain color saturation-viewing angle data Dc measured at specific viewing angles for a known backlight module and an unknown backlight module and calculate a ratio of the color saturation-viewing angle Dc of the known backlight module to the color saturation-viewing angle Dc of the unknown backlight module. Take this ratio as a ratio x indicating the changes of the color saturation-viewing angle Dc and input x to the formula y=3.0703x−2.0416 to calculate y, which is a ratio of the viewing angle of the known backlight module to the viewing angle of the unknown backlight module. As long as the brightness-viewing angle values A at various angles are measured for the known backlight module, the brightness-viewing angle values Z at corresponding angles can be obtained for the unknown backlight module by calculating A*y, that is, Z=A*y=A*(3.0703x−2.0416).

It can be understood that in above formula Z=A*y=A*(3.0703x−2.0416), y=3.0703x−2.0416 is obtained based on actual situation to obtain a normalized linear relationship between x and y. Accordingly, the values 3.0703 and 2.0416 may be varied within a range of ±(0.1%-2%) to match actual situation for avoiding a deviation caused from measurement error.

Figure 8:
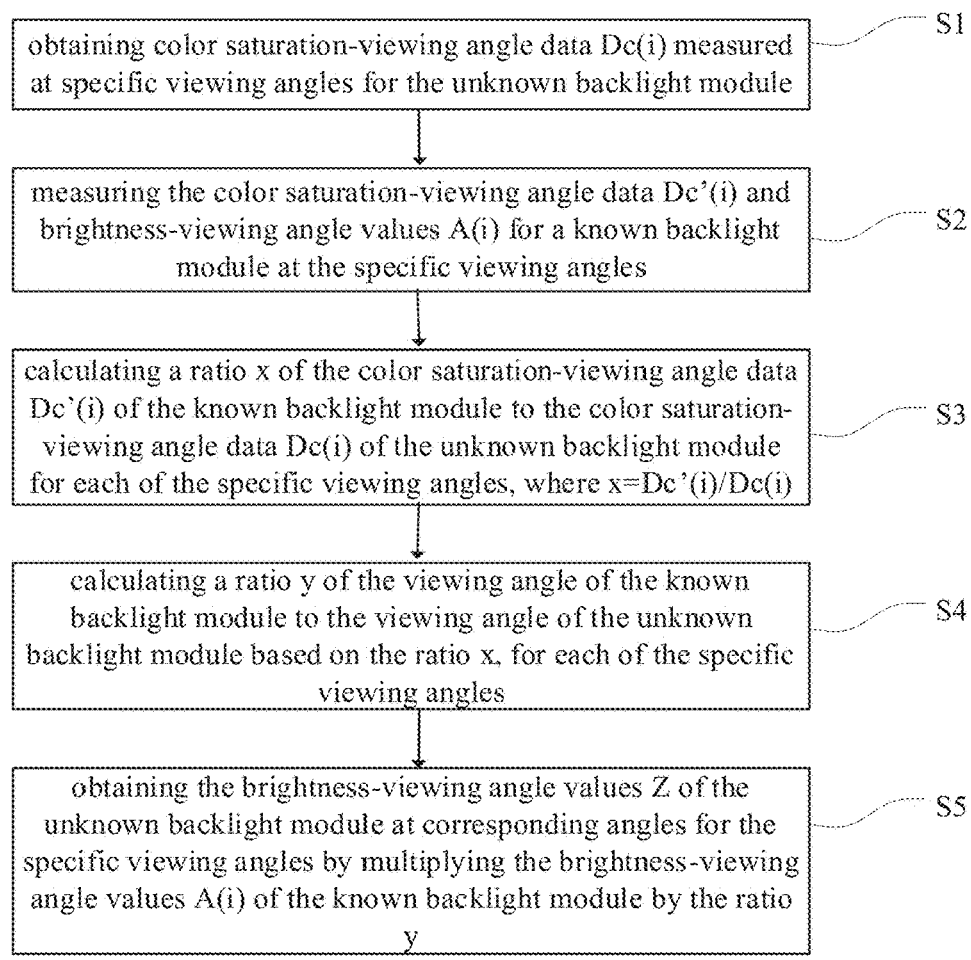
FIG. 8 is a flowchart of a method for calculating viewing angle of an unknown backlight module according to an embodiment of the present invention.
Figure 9A:
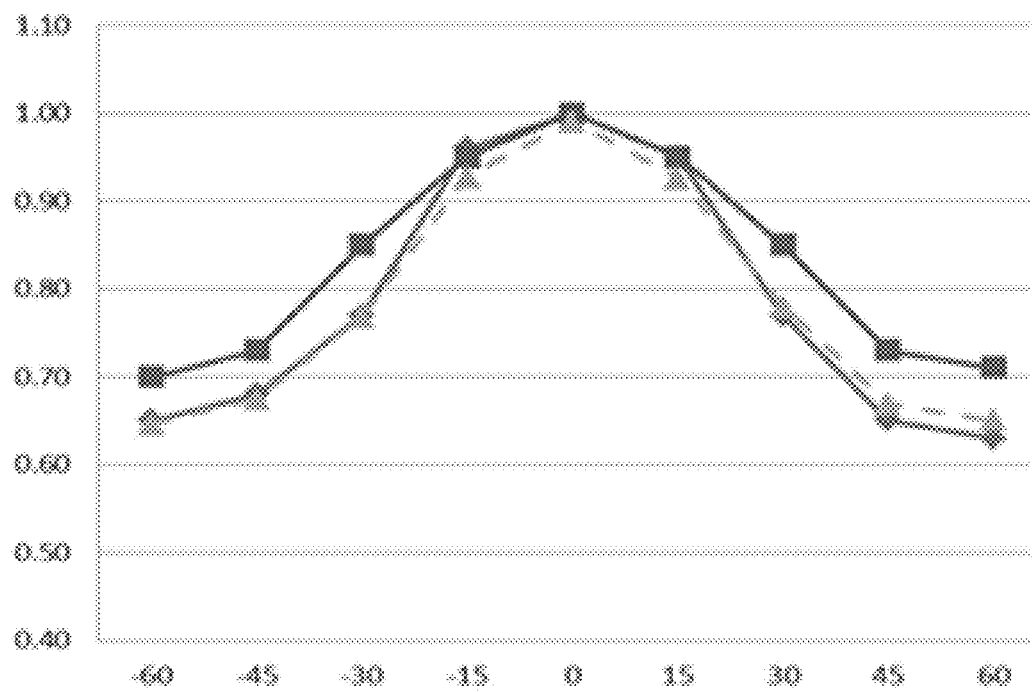
FIG. 9A is a diagram showing measurements on gray levels versus luminance, made for Skin2 for a same product by our backlight brightness measurement, client's backlight brightness measurement and a simulation using formula.
Figure 9B:
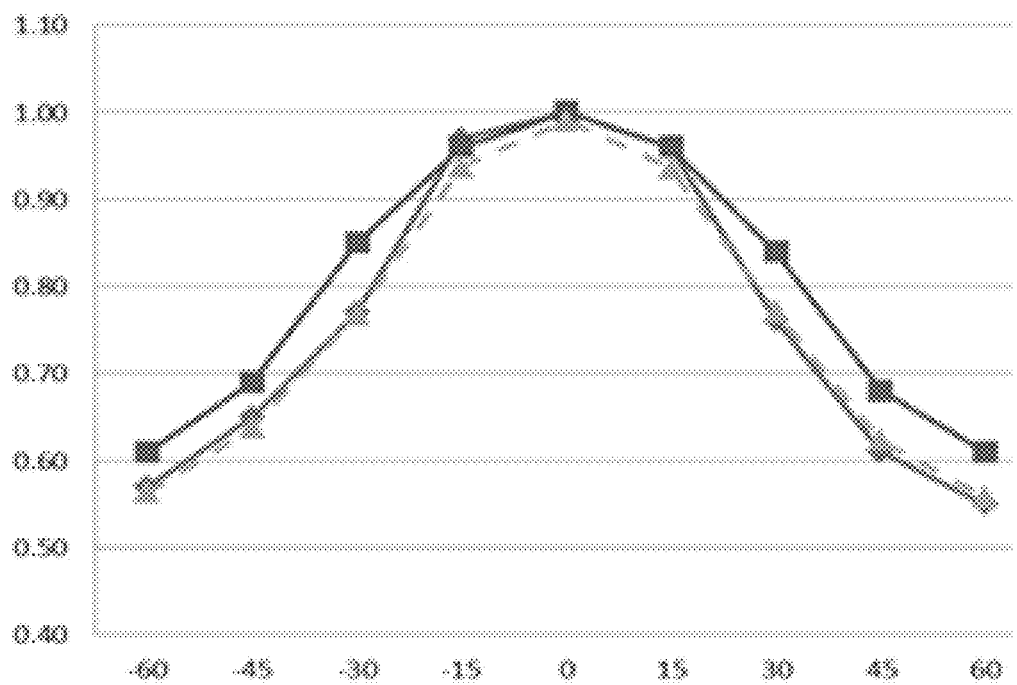
FIG. 9B is a diagram showing measurements on gray levels versus luminance, made for Skin4 for a same product by our backlight brightness measurement, client's backlight brightness measurement and a simulation using formula.
Figure 9C:
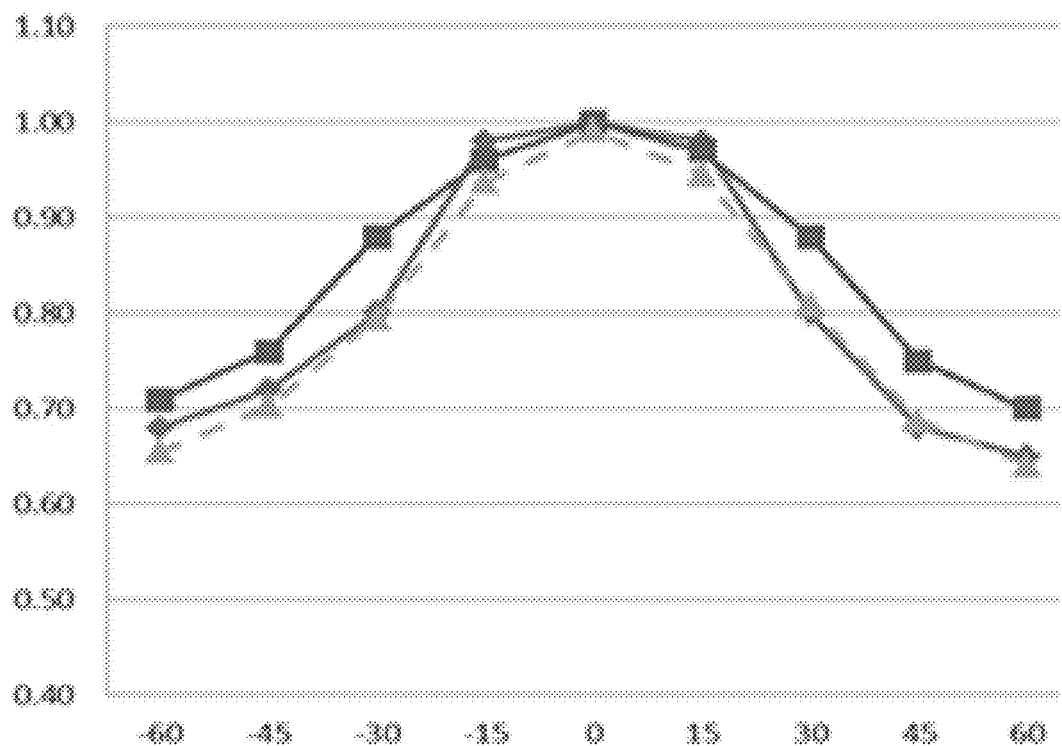
FIG. 9C is a diagram showing measurements on gray levels versus luminance, made for Skin5 for a same product by our backlight brightness measurement, client's backlight brightness measurement and a simulation using formula.
Figure 9D:
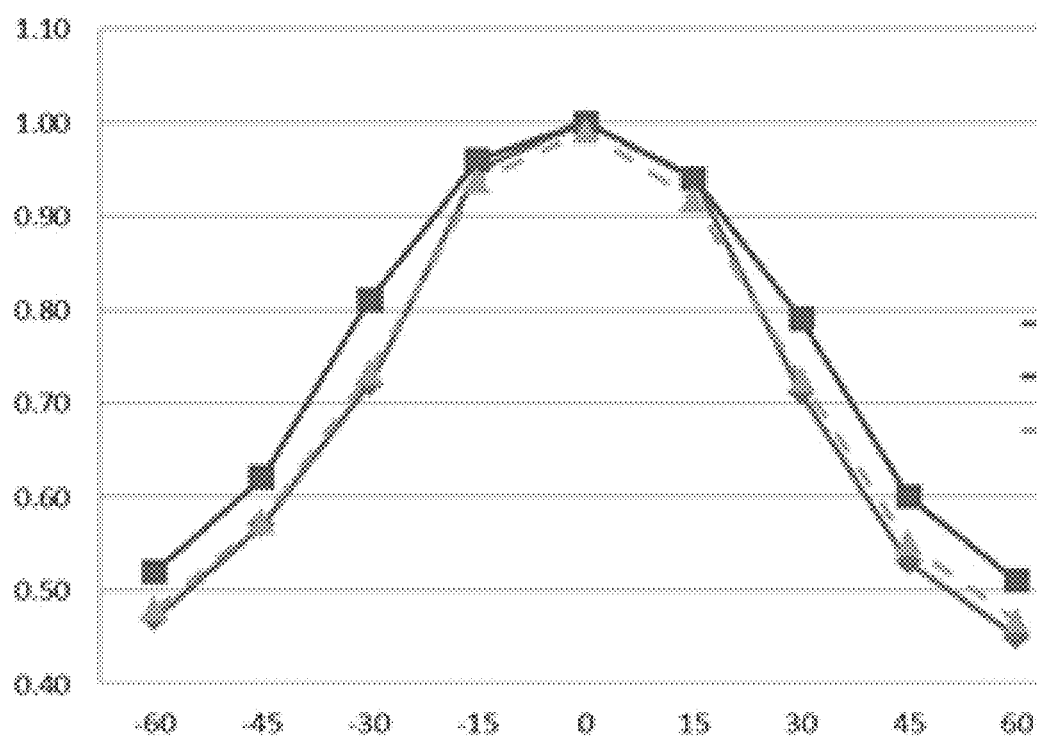
FIG. 9D is a diagram showing measurements on gray levels versus luminance, made for Skin6 for a same product by our backlight brightness measurement, client's backlight brightness measurement and a simulation using formula.

More detailedly, referring to FIG. 8, an embodiment of the present invention provides a method for calculating viewing angle for an unknown backlight module, which includes the following steps.

S1—obtaining color saturation-viewing angle data Dc(i) measured at specific viewing angles for an unknown backlight module;

S2—measuring the color saturation-viewing angle data Dc'(i) and brightness-viewing angle values A(i) for a known backlight module at the specific viewing angles;

S3—calculating a ratio x of the color saturation-viewing angle data Dc'(i) of the known backlight module to the color saturation-viewing angle data Dc(i) of the unknown backlight module for each of the specific viewing angles, where x=Dc'(i)/Dc(i);

S4—calculating a ratio y of the viewing angle of the known backlight module to the viewing angle of the unknown backlight module based on the ratio x, for each of the specific viewing angles; and S5—obtaining the brightness-viewing angle values Z of the unknown backlight module at corresponding angles for the specific viewing angles by multiplying the brightness-viewing angle values A(i) of the known backlight module by the ratio y, where Z=A(i)*y.

In above steps, i represents each of the specific viewing angles and the use of it is to distinguish measured values at these angles.

In the present embodiment, a positive correlation exists between the ratio y and the ratio x.

In the present embodiment, a relation between the ratio y and the ratio x satisfies y=3.0703x−2.0416. Meanwhile, the brightness-viewing angle values Z of the unknown backlight module at corresponding angles for the specific viewing angles are determined by Z=A(i)*y=A(i)*(3.0703x−2.0416). The values 3.0703 and 2.0416 may be varied within a range of ±(0.1%-2%) to match actual situation for avoiding a deviation caused from measurement error.

In the present embodiment, the specific viewing angles are horizontal or vertical viewing angles and are within ±(0-90) degrees.

In the present embodiment, the angles among the specific viewing angles include 0, ±15, ±30, ±45, ±60 and ±90 degrees.

Based on the afore-described method for calculating the viewing angle of the unknown backlight module, for a same product, measurements on gray levels versus luminance are made for Skin2, Skin4, Skin5 and Skin6, respectively, by our backlight brightness measurement, client's backlight brightness measurement and a simulation using the formula Z=A*y=A*(3.0703x−2.0416). Referring to FIGS. 9A, 9B, 9C and 9D for the results, in these figures, the line connecting rectangular blocks indicates our backlight brightness measurements, the line connecting rhombus blocks indicates client's backlight brightness measurements and the line connecting triangular blocks indicates a simulation result using the formula.

As can be known from the comparison, there is a difference between client's measurement data and our measurement data. It has been verified that it is caused by precision and aging of equipments. As a result, deploying the viewing angle of the backlight module totally based on the data provided by the client will cause products to be unable to meet the requirements. Our tests are basically consistent with the simulation results using the formula. Therefore, we can fully satisfy client's needs by using the method for calculating the viewing angle of the unknown backlight module in accordance with the present embodiment. The accuracy of the formula Z=A*y=A*(3.0703x−2.0416) of the present application can also be tested or verified from another point of view. In order to avoid a deviation caused from measurement error, the values 3.0703 and 2.0416 may be varied within a range of ±(0.1%-2%) to match actual situation. Preferably, the variation is 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8% or 1.9%.

The present invention further provides a backlight module, which uses any of the methods for calculating the viewing angle of the unknown backlight module to deploy the viewing angle of the backlight module. It is achieved that the viewing angle of a produced backlight module is deployed to be as the same as the viewing angle of the unknown backlight module. Detailed steps of the method are as the same as the afore-described method for calculating the viewing angle of the unknown backlight module, and are not repeated herein.

The beneficial effects of the present invention are described as follows. A method for calculating viewing angle of an unknown backlight module and a backlight module are provided. Brightness-viewing angle values of the unknown backlight module can be calculated according to the color saturation-viewing angle data of the unknown backlight module at specific viewing angles, and thus are taken to deploy the brightness-viewing angle values of a produced backlight module to be as the same as the brightness-viewing angle values of the unknown backlight module. This avoids the problem of inability to accurately deploy the brightness-viewing angle parameter of a produced backlight module caused when viewing angle data of the backlight module are unavailable, thereby improving customer satisfaction.

Above descriptions are preferred embodiments of the present invention. It should be noted that various modifications and alterations can be made by persons skilled in this art without departing from the principles of the present invention, and that all modifications and alterations are within the scope of the present invention.

The invention claimed is:

1. A method for calculating viewing angle of an unknown backlight module, comprising steps of:
    obtaining color saturation-viewing angle data Dc(i) measured at specific viewing angles for the unknown backlight module;
    measuring the color saturation-viewing angle data Dc'(i) and brightness-viewing angle values A(i) for a known backlight module at the specific viewing angles;
    calculating a ratio x of the color saturation-viewing angle data Dc'(i) of the known backlight module to the color saturation-viewing angle data Dc(i) of the unknown backlight module for each of the specific viewing angles, where x=Dc'(i)/Dc(i);
    calculating a ratio y of the viewing angle of the known backlight module to the viewing angle of the unknown backlight module based on the ratio x, for each of the specific viewing angles; and
    obtaining the brightness-viewing angle values Z of the unknown backlight module at corresponding angles for the specific viewing angles by multiplying the brightness-viewing angle values A(i) of the known backlight module by the ratio y, where Z=A(i)*y.

2. The method according to claim 1, wherein a positive correlation exists between the ratio y and the ratio x.

3. The method according to claim 1, wherein a relation between the ratio y and the ratio x satisfies y=3.0703x−2.0416.

4. The method according to claim 3, wherein the values 3.0703 and 2.0416 are varied within a range of ±(0.1%-2%).

5. The method according to claim 3, wherein the value 2.0416 is varied within a range of ±(0.1%-2%).

6. The method according to claim 1, wherein the specific viewing angles are horizontal or vertical viewing angles and are within ±(0-90) degrees.

7. The method according to claim 1, wherein the angles among the specific viewing angles include 0, ±15 and ±30 degrees.

8. The method according to claim 1, wherein the angles among the specific viewing angles include ±45, ±60 and ±90 degrees.

9. The method according to claim 1, wherein a maximum gray level for the backlight module is 128.

10. The method according to claim 1, wherein a maximum gray level for the backlight module is 255.

* * * * *